(12) United States Patent
Brunson

(10) Patent No.: US 11,590,813 B2
(45) Date of Patent: Feb. 28, 2023

(54) APPARATUS AND METHOD FOR REDUCING HITCH RATTLE

(71) Applicant: Rattle Silencer, LLC, Forsyth, GA (US)

(72) Inventor: Thomas L. Brunson, Forsyth, GA (US)

(73) Assignee: RATTLE SILENCER, LLC, Forsyth, GA (US)

( * ) Notice: Subject to any disclaimer, the term of this patent is extended or adjusted under 35 U.S.C. 154(b) by 55 days.

(21) Appl. No.: 17/220,564

(22) Filed: Apr. 1, 2021

(65) Prior Publication Data
US 2021/0316581 A1 Oct. 14, 2021

Related U.S. Application Data

(60) Provisional application No. 63/100,963, filed on Apr. 9, 2020.

(51) Int. Cl.
*B60D 1/24* (2006.01)
*B60D 1/145* (2006.01)
*B60D 1/06* (2006.01)

(52) U.S. Cl.
CPC ........... *B60D 1/241* (2013.01); *B60D 1/065* (2013.01); *B60D 1/145* (2013.01)

(58) Field of Classification Search
CPC ......... B60D 1/241; B60D 1/065; B60D 1/145
USPC ...................................................... 280/506
See application file for complete search history.

(56) References Cited

U.S. PATENT DOCUMENTS

| | | | | |
|---|---|---|---|---|
| 6,382,656 | B1* | 5/2002 | Johnson, Jr. | B60D 1/60 280/506 |
| 6,834,879 | B1* | 12/2004 | Lorman | B60D 1/06 280/483 |
| 7,004,491 | B1* | 2/2006 | Allsop | B60D 1/52 280/491.2 |
| 7,594,673 | B1* | 9/2009 | Devlin | B60D 1/50 280/506 |

(Continued)

OTHER PUBLICATIONS

MaxxHaul Anti Wobble Adapter Stabilizer. Amazon.com: MaxxHaul 70283 4-Bolt Sturdy Anti-Wobble 2"×2" Hitch Adapter Stabilizer: Automotive.

(Continued)

*Primary Examiner* — Kevin Hurley
*Assistant Examiner* — Hosam Shabara
(74) *Attorney, Agent, or Firm* — Sand, Sebolt & Wernow Co., LPA

(57) ABSTRACT

A silencer assembly for trailer hitches and a method of use thereof. The silencer assembly includes a sheet of material that is durable, abrasion-resistant, wear-resistant, ultra-violet light resistant, and sound dampening. An adhesive is applied to a bottom surface of the sheet which is then placed on a portion of the drawbar that is selectively receivable in a bore of receiver tube of the trailer hitch. The adhesive fixedly secures the sheet to the drawbar. The drawbar is inserted into the receiver bore. The sheet occupies part of a gap defined between an exterior surface of the drawbar and an interior surface of the receiver tube reducing relative movement between the drawbar and the receiver tube, and thereby reducing rattling noises. An additional sheet of material and one or more shims may be used to further reduce the gap between the drawbar and receiver tube, and thereby further reduce rattling.

23 Claims, 6 Drawing Sheets

(56) References Cited

U.S. PATENT DOCUMENTS

| | | | | |
|---|---|---|---|---|
| 7,600,774 | B1* | 10/2009 | Speer | B60D 1/58 |
| | | | | 403/387 |
| 7,717,455 | B2* | 5/2010 | Morris | B60D 1/07 |
| | | | | 280/491.5 |
| 8,596,664 | B2* | 12/2013 | Lahn | B60D 1/241 |
| | | | | 280/495 |
| 8,696,011 | B2* | 4/2014 | Despres | B60D 1/52 |
| | | | | 280/495 |
| 8,833,791 | B2* | 9/2014 | Prescott | B60D 1/07 |
| | | | | 280/506 |
| 9,376,063 | B2* | 6/2016 | Hein | B60R 9/06 |
| 9,981,513 | B2* | 5/2018 | Belinky | B60D 1/605 |
| 10,793,079 | B1* | 10/2020 | Shen | B60D 1/241 |
| 2011/0210530 | A1* | 9/2011 | Hancock | B60D 1/02 |
| | | | | 280/506 |

OTHER PUBLICATIONS

TMS Anti Rocking Hitch Wobble Stabilizer 4 Cargo Carrier Anti Rattle Locking Hitch Mount Wobble Bike Rack Hauler. Amazon.com: TMS Anti Rocking 2" Hitch Wobble Stabilizer 4 Cargo Carrier Anti Rattle Locking Hitch Mount Wobble Bike Rack Hauler: A . . . .

Boone Outdoor aka The Wedge No Rattle Hitch Stabilizer. Amazon.com: Boone Outdoor aka The Wedge No Rattle Hitch Stabilizer: Sports & Outdoors.

HitchClamp—Heavy Duty, 2 Inch—Made in the USA—Hitch Tightener, Anti Rattle Device. Amazon.com: HitchClamp—Heavy Duty, 2 Inch—Made in the USA—Hitch Tightener, Anti Rattle Device, Receiver clamp: Automotive.

Anti-Rattle Locking 2.5in Hitch Pin |Silent Hitch Pin| Let's Go Aero. Let's Go Aero.

Hitch Anti-Rattle / Pro Series / Fits 2 Inch Hitch. Pro Series Anti-Rattle Device for 2"×2" Trailer Hitch Receivers Pro Series Hitch Anti-Rattle PS63091.

Free Shipping on Orders Over $99* *Available Within the Contiguous USA. Pro Series Anti-Rattle Device for 1¼"×1¼" Trailer Hitch Receivers Pro Series Hitch Anti-Rattle 63090.

Roadmaster 061 Quiet Hitch. Amazon.com: Roadmaster 061 Quiet Hitch: Automotive.

Amazon.com: Pro-Series 63100 Lock-Tite Anti-Rattle Hitch Pin: Automotive.

Let's Go Aero (SHP 2081 Class I Lockable Silent Hitch Pin. Amazon.com: Let's Go Aero (SHP 2081 Class I Lockable Silent Hitch Pin: Automotive.

Hitch Clamp—Heavy Duty, 2 Inch—Made in the USA—Hitch Tightener, Anti Rattle Device, Receiver clamp.

Hitch Clamp—Cross Clamp 2.5" Heavy Duty—Made in the USA—Anti-Rattle Hitch Coupling clamp/Hitch Tightener Brand: Hitch Clamp. Amazon.com : Hitch Clamp—Cross Clamp 2.5" Heavy Duty—Made in the USA—Anti-Rattle Hitch Coupling clamp/Hitch Tightener : Spo . . . .

MaxxHaul 70258 Steel Finish 2"×2" 2-Bolt Sturdy Anti-Wobble Hitch Adapter Stabilizer Visit the MaxxHaul Store. Amazon.com: MaxxHaul 70258 Steel Finish 2"×2" 2-Bolt Sturdy Anti-Wobble Hitch Adapter Stabilizer: Automotive.

MaxxHaul 70283 4-Bolt Sturdy Anti-Wobble 2"×2" Hitch Adapter Stabilizer Visit the MaxxHaul Store. Amazon.com: MaxxHaul 70283 4-Bolt Sturdy Anti-Wobble 2"×2" Hitch Adapter Stabilizer: Automotive.

Let's Go Aero (SHP 2080 ½" Silent Hitch Pin with Lock Visit the Let's Go Aero Store. Amazon.com: Let's Go Aero (SHP 2080 ½" Silent Hitch Pin with Lock: Automotive.

Let's Go Aero SHP359 Silent Hitch Pin for 2 Inch Hitch Visit the Let's Go Aero Store. Amazon.com: Let's Go Aero SHP359 Silent Hitch Pin for 2 Inch Hitch: Automotive.

* cited by examiner

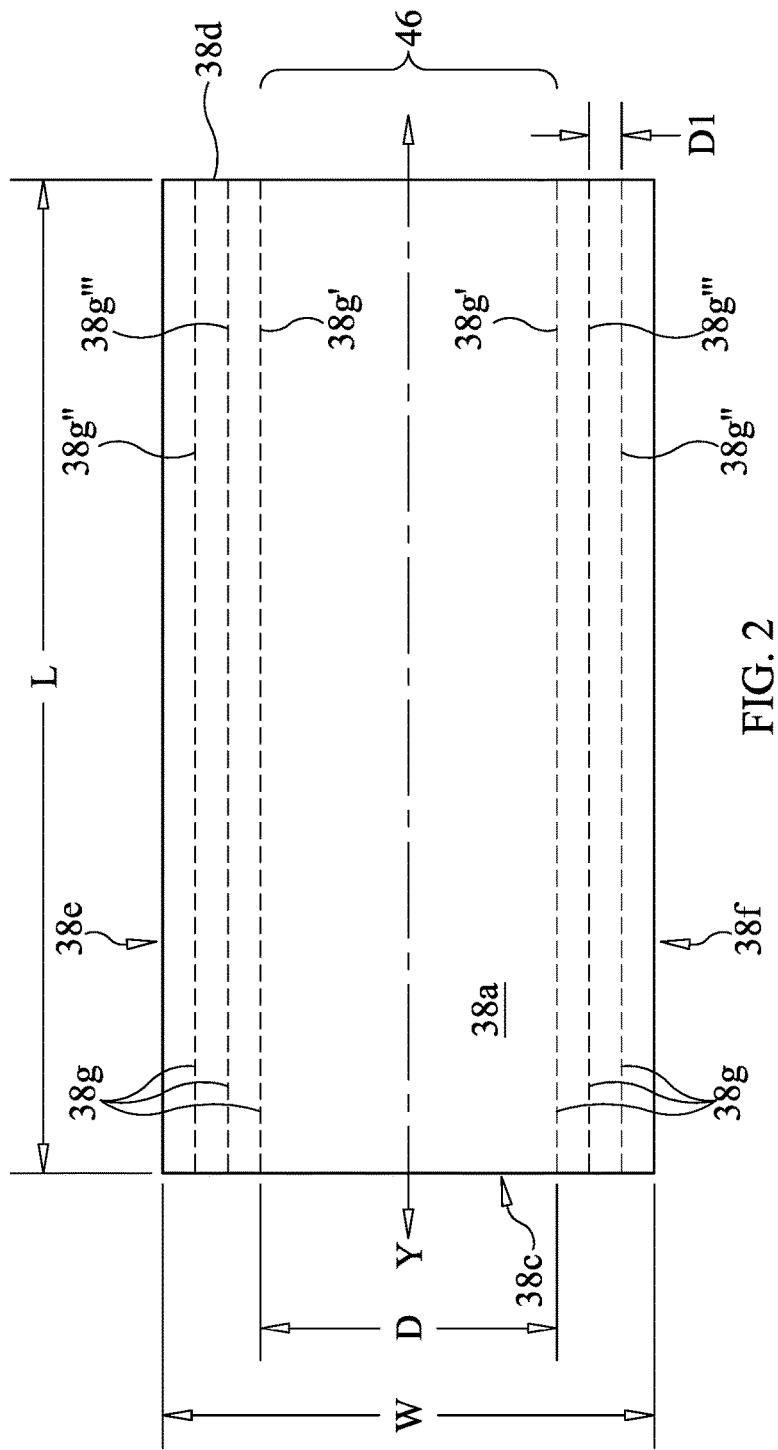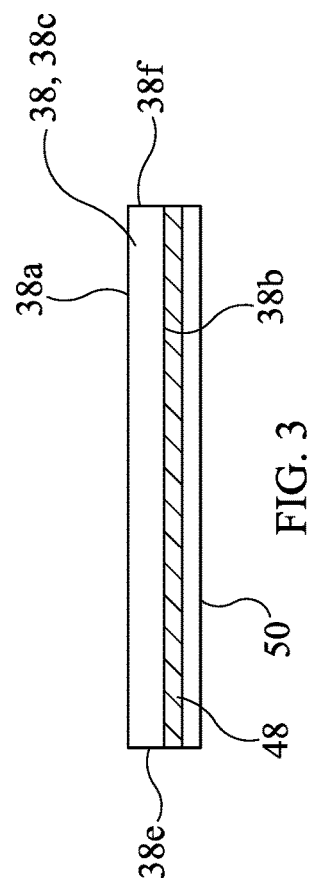

under the US 11,590,813 B2

APPARATUS AND METHOD FOR REDUCING HITCH RATTLE

CROSS REFERENCE TO RELATED APPLICATIONS

This application claims the benefit of U.S. Provisional Application Ser. No. 63/100,963 filed on Apr. 9, 2020, the disclosure of which is incorporated herein by reference.

TECHNICAL FIELD

This disclosure is directed to hitch assemblies. More particularly this disclosure relates to an apparatus and method of reducing rattling noises generated by a hitch assembly. Specifically, the present disclosure is directed to a silencer assembly that is permanently engaged with a drawbar of a trailer hitch assembly. The silencer assembly includes at least one sheet of a durable, low friction, high abrasion, and wear resistant material that is adhesively fixed to an exterior of the drawbar and occupies part of a gap that is formed between the drawbar and an interior surface of the trailer hitch receiver tube.

BACKGROUND

Background Information

A hitch assembly is a piece of equipment that is used to allow some type of trailer to be connected to a vehicle which is then used to tow the trailer. The hitch assembly typically includes a trailer hitch or a receiver hitch that is securely bolted to the underside of the towing vehicle's chassis. A ball mount is provided on the trailer hitch or receiver hitch or is selectively engageable therewith. The ball mount includes a trailer ball that extends upwardly from a ball platform. The trailer that is to be engaged vehicle is provided with a trailer coupler at a leading end. The trailer coupler is configured to be engaged with the trailer ball to secure the trailer to the vehicle. The trailer hitch or receiver hitch includes a receiver tube that defines a tubular recess therein. The receiver tube is typically square in cross-section. A ball mount is engaged with the trailer hitch or receiver hitch. In some instances, the ball mount is an integral part of the trailer hitch but, in other instances, the ball mount is able to be selectively engaged with the trailer hitch. In this latter instance the ball mount includes a drawbar at one end and a ball platform at the other end. The drawbar is sized and shaped to be selectively received in the receiver tube of the trailer hitch or receiver hitch. When the drawbar is received within the receiver tube a locking pin is inserted through aligned holes defined in the drawbar and receiver tube to operatively engage the ball mount to the trailer hitch. A cotter pin is typically used to secure the locking pin in place. The trailer to be towed by the vehicle is provided with a trailer coupler at a leading end. The trailer coupler is provided with a socket configured to receive the trailer ball of the ball mount therein. When the trailer ball is locked within the socket, the trailer is secured to the towing vehicle.

When the towing vehicle tows the trailer, it is extremely common for a rattling noise to be heard by occupants of the towing vehicle. This rattling noise may be generated in one of two locations on the hitch assembly. The first location is the engagement between the receiver tube and the drawbar of the ball mount. The second location is the engagement between the trailer ball and the socket. Every time the towing vehicle and trailer encounter a bump in the road, the loose connection between the drawbar and receiver tube and between the trailer ball and socket can generate a rattling noise. Additionally, these loose connections cause a slight delay in the relative motion of the towing vehicle and trailer, making travel along the road quite jerky and unpleasant.

Several solutions have been proposed in the prior art to address the problem with the connection between the receiver tube on the trailer hitch and the drawbar of the ball mount. One type of solution proposed in the prior art is the provision of a U-shaped bolt that is placed over the drawbar of the ball mount such that the middle section of the U-shaped bolt rests on the top surface of the drawbar and the two side sections of the bolt extend downwardly adjacent the sides of the drawbar, terminating below a bottom surface of the drawbar. A plate is positioned beneath the bottom surface of the receiver tube and the bottom surface of the drawbar and the bolt side sections are inserted through apertures defined in the plate. Nuts are engaged with the two side sections of the U-shaped bolt and are tightened until the plate is firmly engaged with the receiver tube and drawbar. This arrangement causes the receiver tube and drawbar to move in unison with one another and eliminates any rattling noises from that connection. An example of this type of system is the MaxxHaul® 50023 Tightener. (MaxxHaul® is a registered trademark of Bin Lin of Camarillo, Calif., U.S.)

Another prior art device which is used to silence rattling noises created by ball mounts being engaged with a trailer hitch is a lockable hitch pin. One example of this type of device is the LET'S GO AERO® (SHP 2018). (LET'S GO AERO® is a registered trademark of Let's Go Aero, Inc. of Colorado Springs, Colo., U.S.) In this device, a spring nut is inserted into the bore of the drawbar and the spring nut is aligned with the aperture through which a hitch pin will ultimately be received. The drawbar is then inserted into the receiver tube of the trailer hitch until the holes defined by the sides of the drawbar align with the holes defined by the sides of the receiver tube. A specially-configured hitch pin is then inserted through the aligned holes and through the spring nut that is seated with the bore of the drawbar. A sleeve is then engaged with the free end of the hitch pin and a lock is subsequently engaged around the sleeve. The hitch pin is then torqued with a wrench to lock the same in place. Again, this device locks the ball mount and trailer hitch to one another in such a way that they will move in unison with one another.

The prior art devices are capable of reducing the level of noise generated by a ball mount trailer hitch connection but each time the trailer is disengaged from the towing vehicle, the prior art device has to be removed prior to disengaging the ball mount from the trailer hitch. When the trailer is next connected to the trailer hitch, the silencing devices have to be reinstalled. The prior art devices therefore add extra steps to the engagement procedure for connecting a trailer to a towing vehicle, and to the disengagement procedures that need to be performed to disengage the trailer from the towing vehicle. Since the prior art devices require nuts and bolts and other components like plates and locks, there are multiple pieces that may be dropped or misplaced during installation, disengagement, and/or storage of these devices.

SUMMARY

The apparatus and method of reducing noise generated by the engaging a ball mount with a trailer hitch addresses some of the disadvantages of the prior art devices.

A silencer assembly for trailer hitches and a method of use thereof is disclosed herein. The silencer assembly includes a sheet of material that is durable, abrasion-resistant, wear-resistant, ultra-violet light resistant, and sound dampening. An adhesive is applied to a bottom surface of the sheet which is then placed on a portion of the drawbar that is selectively receivable in a bore of receiver tube of the trailer hitch. The adhesive fixedly secures the sheet to the drawbar. The drawbar is inserted into the receiver bore. The sheet occupies part of a gap defined between an exterior surface of the drawbar and an interior surface of the receiver tube reducing relative movement between the drawbar and the receiver tube, and thereby reducing rattling noises. An additional sheet of material and one or more shims may be used to further reduce the gap between the drawbar and receiver tube, and thereby further reduce rattling.

In one aspect, an exemplary embodiment of the present disclosure may provide in combination, a ball mount including a drawbar adapted for insertion in a bore of a trailer hitch receiver tube; and a silencer assembly that is fixedly engaged with an exterior surface of the drawbar, wherein the silencer assembly is interposed between the exterior surface of the drawbar and an interior surface of the trailer hitch receiver tube that defines the bore.

In one embodiment the silencer assembly may comprise a first silencer member that is fixedly engaged with one of a top surface and a bottom surface of the drawbar. In one embodiment, the first silencer member may include a first portion that is fixedly engaged with a first side wall of the drawbar. In one embodiment, the first silencer member may include a second portion that is fixedly engaged with a second side wall of the drawbar. In one embodiment, the silencer assembly may further comprises a second silencer member that is fixedly engaged with the other of the top surface and the bottom surface of the drawbar. In one embodiment, the second silencer member may include a first part that is fixedly engaged with a first side wall of the drawbar. In one embodiment, the second silencer member may include a second part that is fixedly engaged with a second side wall of the drawbar. In one embodiment, each of the first portion and the second portion of the first silencer member may be separated from a remainder of the first silencer member by a fold line, and each of the first portion and the second portion is foldable relative to the remainder of the first silencer member about the fold line. In one embodiment, the fold line includes a series of spaced apart perforations. In one embodiment the fold line may be one of a plurality of adjacent fold lines that are laterally spaced from one another. In one embodiment, the combination may further comprise an adhesive layer applied between the first silencer member and the exterior surface of the drawbar to fixedly engage the first silencer member to the exterior surface. In one embodiment, the adhesive layer may retain the first silencer member in engagement with the drawbar through repeated insertions and withdrawals of the drawbar with respect to the trailer hitch receiver tube. In one embodiment, the combination may further comprise a first shim that is selectively fixedly engageable to an outer surface of the first silencer member. In one embodiment, the combination may further comprise an adhesive layer provided between the first shim and the outer surface of the first silencer member.

In another aspect, an exemplary embodiment of the present disclosure may provide a silencer assembly for use in damping rattling in a trailer hitch assembly, wherein said silencer assembly comprises a sheet of material that is planar and flexible and has an outer surface and an opposed inner surface, a first end and an opposed a second end, and a first side and opposed second side, said, said sheet of material having a longitudinal axis which extends between the first and second ends; a first fold line located a distance inwardly from the first side and a second fold line located a distance inwardly from the second side, wherein the first fold line and second fold line extend between the first end and the second end of the sheet of material and are oriented parallel to one another and to the longitudinal axis; a central region located between the first fold line and the second fold line and extending between the first end and the second end of the sheet of material, wherein a first region of the sheet of material between the first fold line and the first side is foldable relative to the central region in a first direction, and wherein a second region of the sheet of material between the second fold line and the second side is foldable relative to the central region in a second direction so as to form the sheet of material into a U-shaped component; and a layer of adhesive applied over the inner surface of the sheet of material, said adhesive being adapted to secure the U-shaped component to a drawbar of a ball mount that is insertable into a bore of a receiver tube of the trailer hitch assembly.

In one embodiment, each of the first fold line and the second fold line may include a series of perforations. In one embodiment, the sheet of material may be a sheet of an ultra-high molecular weight polyethylene. In one embodiment, the layer of adhesive may be a layer of a pressure-sensitive adhesive.

In another aspect, and exemplary embodiment of the present disclosure may provide a method of preventing rattling between a trailer hitch receiver tube and a drawbar of a trailer ball mount, said method including steps of providing a planar sheet of material that is one or more of durable, abrasion-resistant, wear-resistant, ultra-violet light resistant and sound dampening; applying an adhesive to a bottom surface of the planar sheet of material; placing the planar sheet of material on one of a top wall and a bottom wall of a portion of the drawbar that is receivable in a bore of the trailer hitch receiver tube; fixedly securing the planar sheet of material to the top wall with the adhesive; occupying at least part of a gap defined between the exterior surface of the drawbar and an interior surface of the trailer hitch receiver tube that defines the bore; and reducing relative movement between the drawbar and the interior surface of the trailer hitch receiver tube with the planar sheet of material.

In one embodiment, the method may further comprise reducing rattling noises produced by the drawbar moving within the bore with the planar sheet of material. In one embodiment, the method may further comprise folding a first region of the planar sheet of material about a fold line and extending the first region along a portion of a side wall of the drawbar. In one embodiment, the method may further comprising terminating the first region of the planar sheet of material a distance away from a hitch-pin-receiving hole defined in the side wall of the drawbar. In one embodiment, the method may further comprise providing a shim; adhering the shim to an outer surface of the planar sheet of material; inserting the drawbar into the bore of the trailer hitch receiver tube; and further reducing relative movement between the drawbar and the interior surface of the trailer hitch receiver tube with the shim.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2 is a top plan view of a first silencer member of the silencer assembly shown in isolation;

FIG. 3 is a left side elevation view of the first silencer member of FIG. 2;

Similar numbers refer to similar parts throughout the drawings.

DETAILED DESCRIPTION

Figure 1:
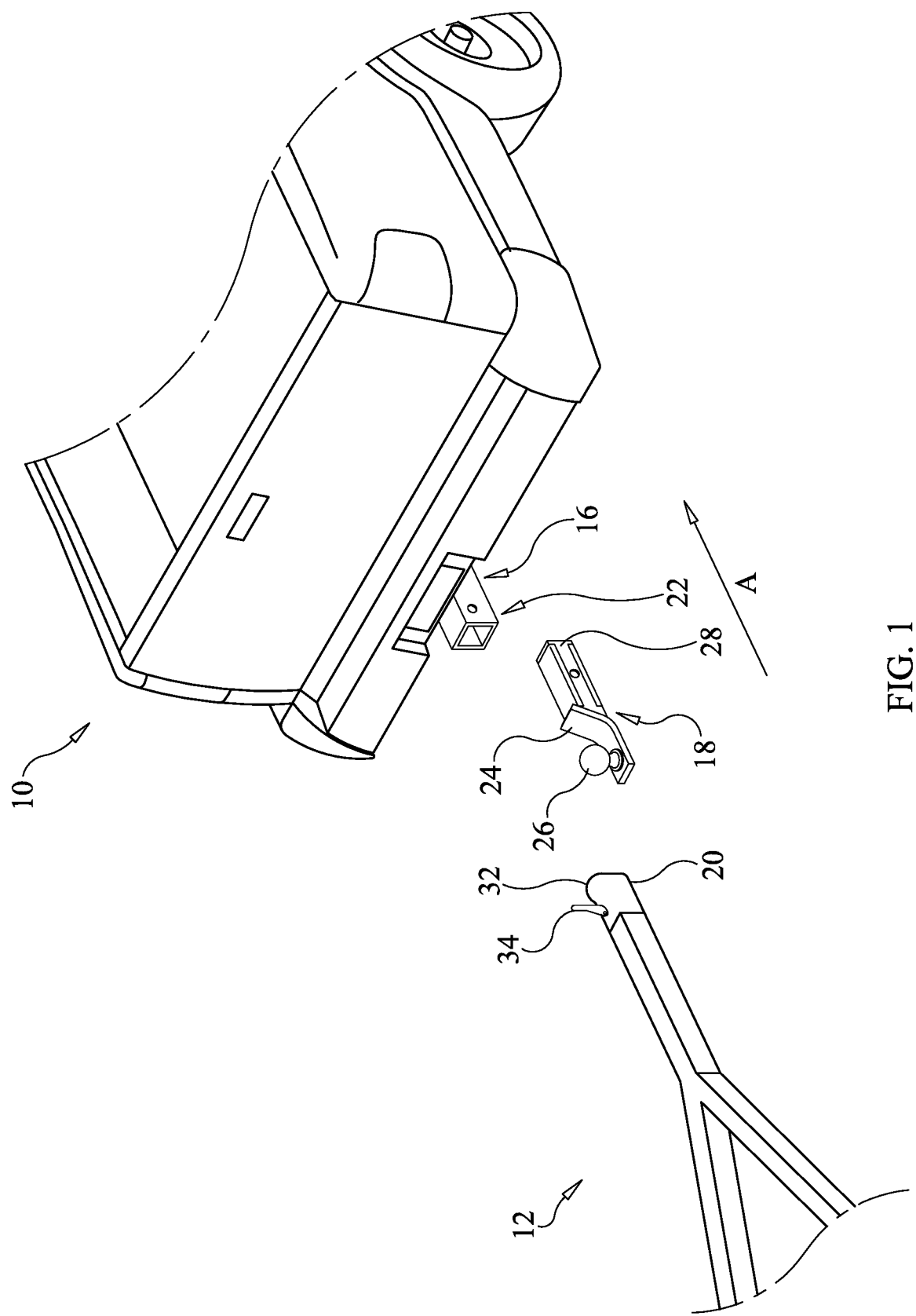
FIG. 1 is an exploded top, rear, right side perspective view of a hitch assembly used to engage a trailer to a vehicle, wherein a ball mount of the hitch assembly includes a silencing apparatus in accordance with an aspect of the present disclosure.

Referring to FIG. 1, there is shown a partial rear end of a vehicle 10 and a partial front end of a trailer 12. The vehicle 10 and trailer 12 are selectively engageable with one another by way of a hitch assembly 14. Vehicle 10 as illustrated is a pickup truck. Vehicle 10 could, alternatively, be a Sport Utility Vehicle (SUV), a different type of truck, an automobile, a piece of landscaping equipment, or any other type of vehicle or equipment with which a trailer 12 is selectively engageable via a hitch assembly 14. Trailer 12, as illustrated, could be a boat trailer or a trailer used to transport landscaping equipment. It should be understood that the front end of trailer 12 is representative of any type of trailer that is selectively attachable to any type of vehicle. Trailer 12 is also representative of any type of equipment that may be engaged with vehicle 10. Trailer 12 should be understood to be representative of equipment like landscaping attachments or snow clearing attachments, for example. While FIG. 1 shows an arrangement where trailer 12 is located rearwardly of the rear end of vehicle 10, in other applications, trailer 12 may be located forwardly of vehicle 10. This latter configuration may be utilized, for example, when engaging landscaping equipment to a landscaping vehicle such as a zero turn mower or a utility vehicle.

Hitch assembly 14, as illustrated, includes a trailer hitch or receiver hitch 16 that is permanently secured to vehicle 10. (The trailer hitch or receiver hitch will be referred to herein as "trailer hitch 16".) Hitch assembly 14 further includes a ball mount, generally indicated at 18 and a trailer coupler 20. Ball mount 18 is selectively removably engageable with trailer hitch 16. Trailer coupler 20 is substantially permanently engaged with trailer 12.

Trailer hitch 16 may be of any suitable type and may include a rear bar (not shown) and a pair of mounting assemblies (not shown) that are provided proximate each end of the rear bar. The rear bar will be oriented transversely relative to a longitudinal axis of the vehicle 10 (where the longitudinal axis extends between a front end and a rear end of the vehicle). The mounting assemblies will be operatively secured to the vehicle's frame (not shown) in order to fixedly secure the rear bar to the frame. A receiver tube 22 is integrally formed with the rear bar and extends outwardly and rearwardly therefrom. Receiver tube 22 is generally oriented at right angles to the rear bar and parallel to the longitudinal axis of the vehicle 10.

Figure 6:
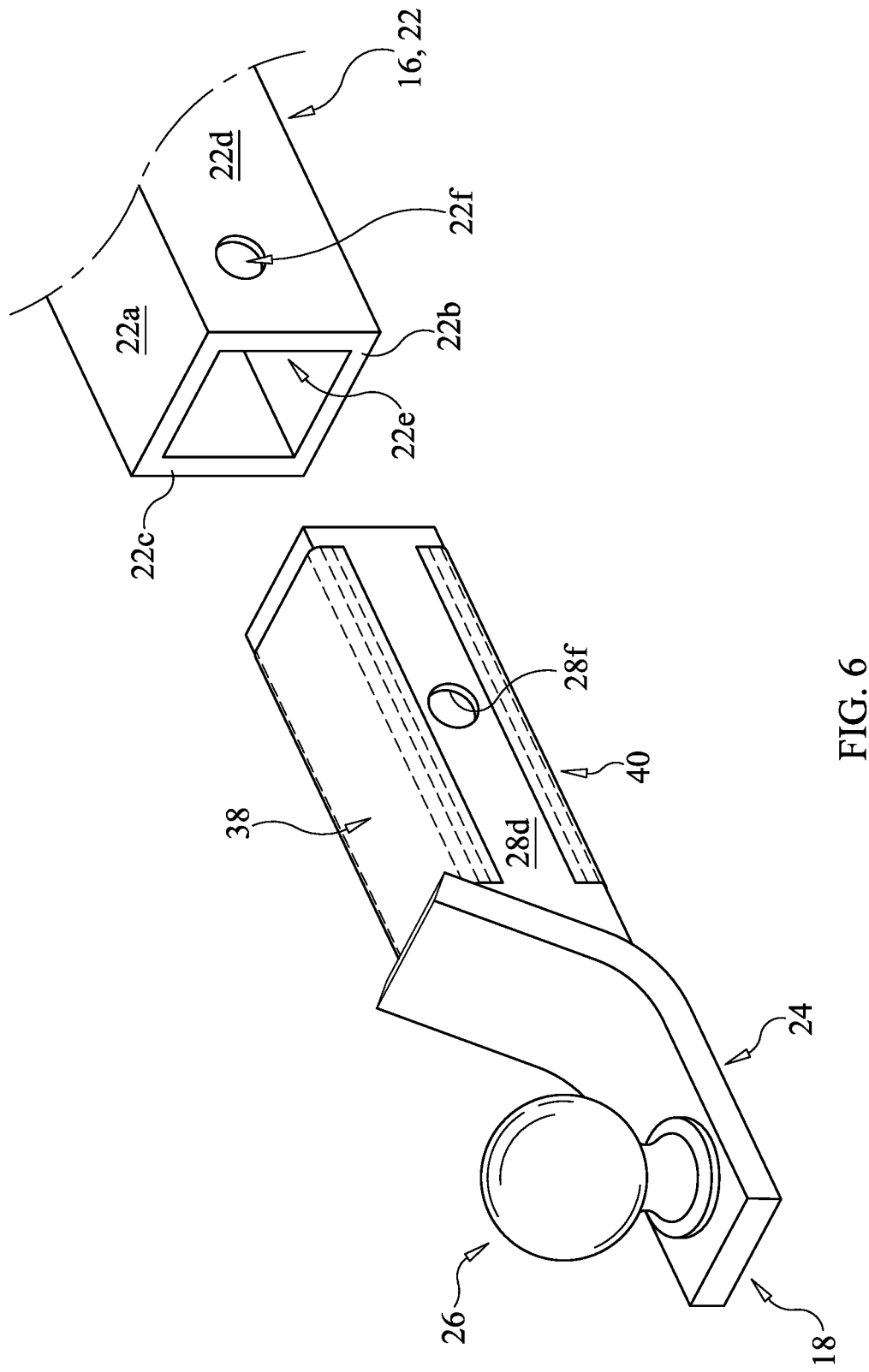
FIG. 6 is a top, rear, right side perspective view of the ball mount of FIG. 5 showing the first silencer member and second silencer member engaged with the drawbar of the ball mount, and further showing the ball mount positioned proximate the receiver tube of the trailer hitch.
Figure 7:
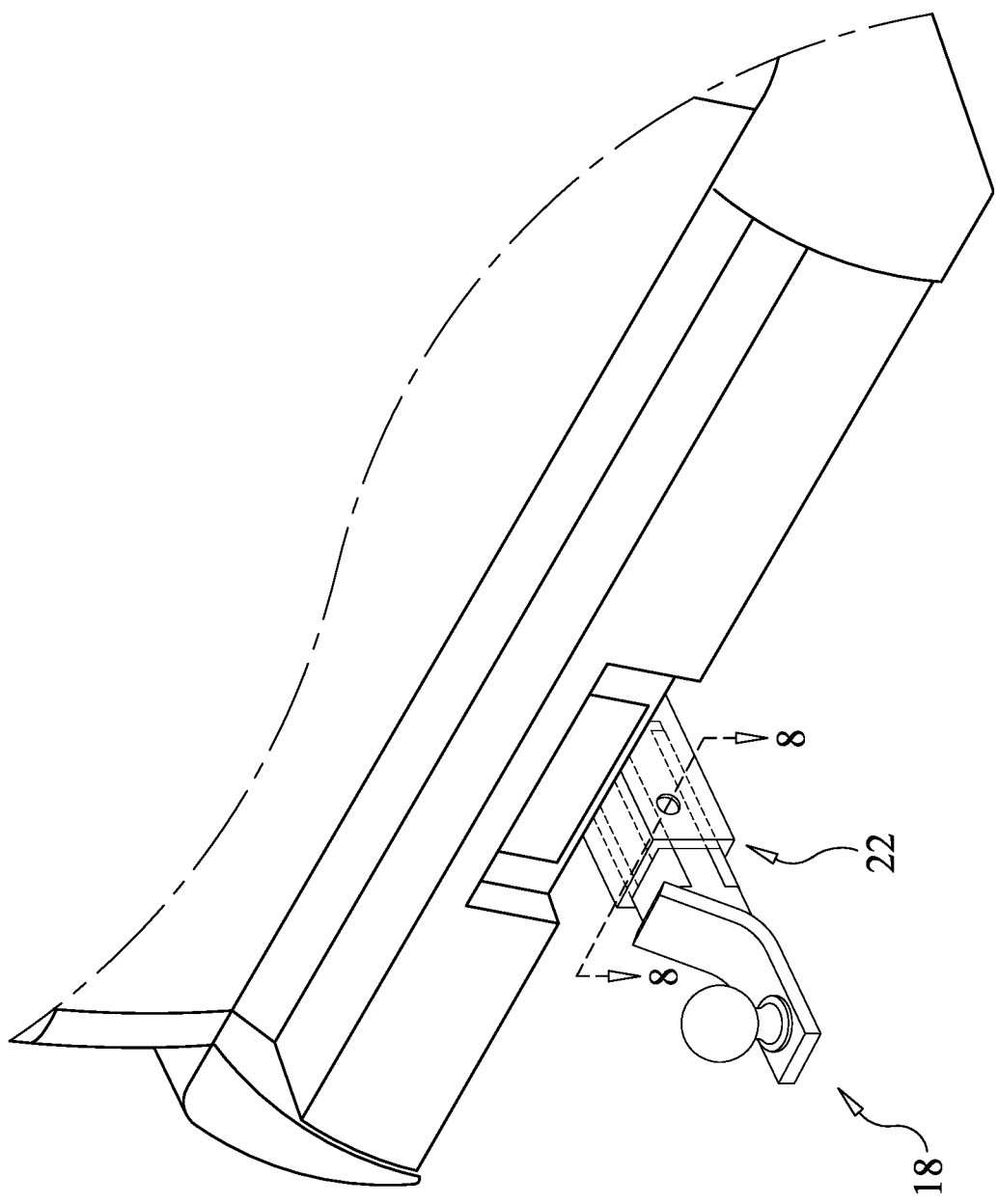
FIG. 7 is an enlarged top, rear, right side perspective view of the ball mount of FIG. 6 shown engaged within a receiver tube of the trailer hitch.

As best seen in FIG. 6, receiver tube 22 is longitudinally a rectangular cuboid in shape and is furthermore generally a generally square in cross-section. Receiver tube 22 includes an upper wall 22a, a lower wall 22b, a first side wall 22c, and a second side wall 22d. A bore 22e is bounded and defined by upper wall 22a, lower wall 22b, and first and second side walls 22c, 22d. Bore 22e is also square in cross-section. An opening to bore 22e is provided in a rear end of receiver tube 22 that is located remote from the rear bar of trailer hitch 16. Bore 22e extends generally parallel to the longitudinal axis of the vehicle. A reinforced rim (not shown) may be provided proximate rear end of receiver tube 22 and circumscribe the opening to bore 22e. The opposed first and second side walls 22c, 22d each define a hole 22f therein. The holes 22f in the opposed side walls 22c, 22d are transversely aligned with one another and are in fluid communication with bore 22e.

Figure 5:
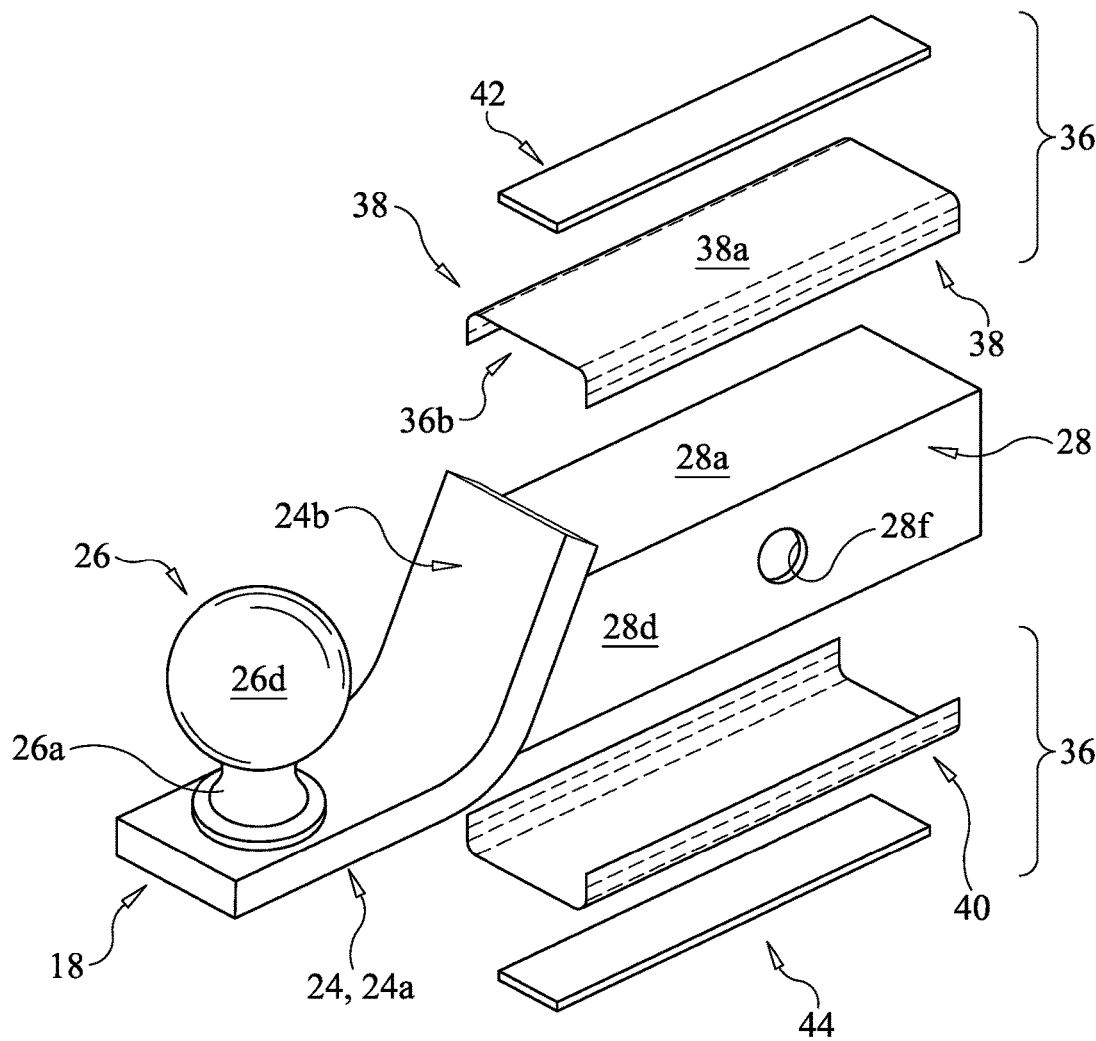
FIG. 5 is a top, rear, right side perspective view of the ball mount shown in isolation with component parts of the silencing apparatus of the present disclosure shown exploded away from a drawbar of the ball mount.

Referring to FIG. 5, an exemplary ball mount 18 is illustrated. Ball mount 18 is illustrated as including a ball platform 24, a trailer ball 26, and a drawbar 28. It is presumed herein that the user will select a ball mount 18 that is of a compatible size to the receiver tube 22 provided on trailer hitch 16. In other words, the drawbar 28 of the ball mount 18 must be correctly sized to be received within the bore 22e of the receiver tube 22.

It will be understood that the ball mount may be differently configured to how the component is illustrated in the attached figures.

Trailer ball platform 24, as illustrated, is generally L-shaped and includes a first leg 24a and a second leg 24b. Second leg 24b extends upwardly and outwardly from an end of first leg 24a and is oriented at an obtuse angle relative to first leg. Trailer ball 26 is provided on first leg 24a of ball platform 24. Trailer ball 26 includes a stem 26a that extends vertically upwardly from the upper surface of the first leg 24a and the ball 26b is integrally formed with stem 26a. Stem 26b retains the ball 26b a distance vertically above the upper surface of first leg 24a.

Drawbar 28 extends outwardly from a lower surface of second leg 24b of trailer ball platform 24. As best seen in FIG. 5, drawbar 28 is a rectangular cuboid in shape and is generally complementary in cross-sectional shape and size to bore 22e of receiver tube 22. The exterior surface of drawbar 28 is generally square in cross-section and is configured to be selectively received within bore 22e of receiver tube 22. Complementary drawbars 28 and trailer hitches 16 tend to be made of relatively loose tolerance materials. There is therefore often a gap or space that circumscribes the portion of the drawbar 28 that is received within the receiver tube 22 of the trailer hitch 16. This gap or space tends to be responsible for rattling noises being generated as the drawbar 28 moves vertically up and down and/or laterally left and right within the bore 22e of the receiver tube 22.

Figure 8:
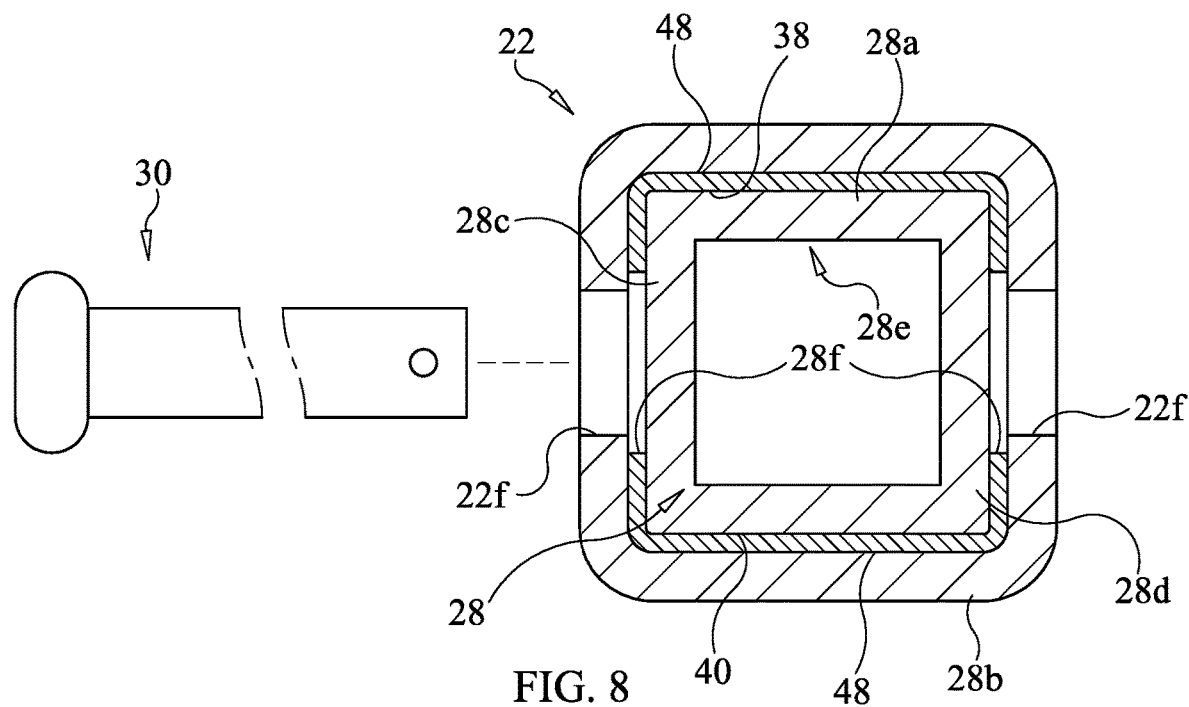
FIG. 8 is a cross-section of the receiver tube and drawbar taken along line 8-8 of FIG. 7.
Figure 9:
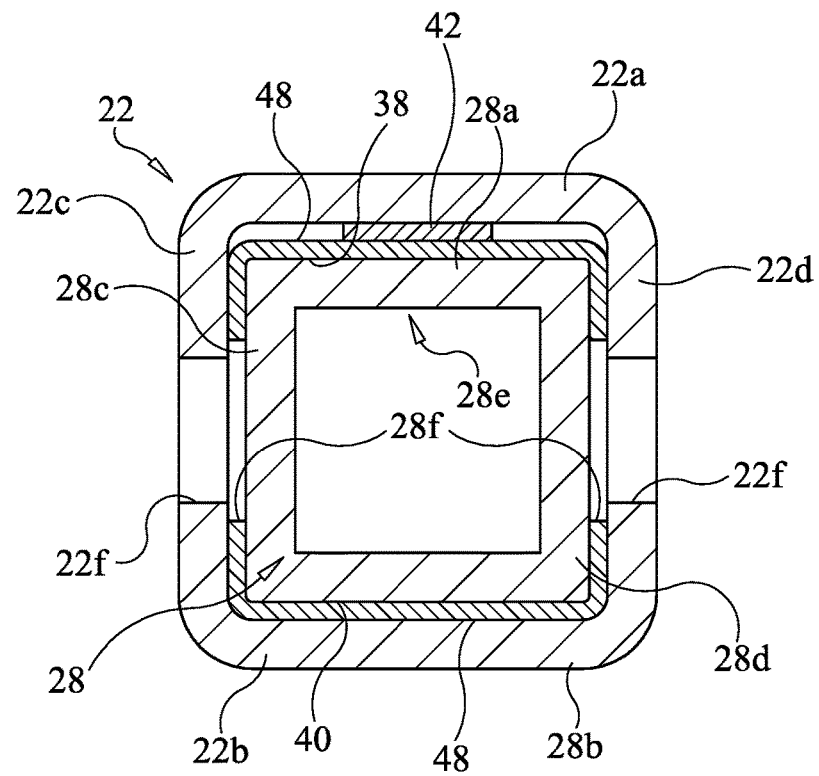
FIG. 9 is a cross-section of the receiver tube and drawbar similar to FIG. 8 but additionally showing the first shims of the silencer assembly positioned between the first silencer member engaged on the ball drawbar and an interior surface of the receiver tube of the trailer hitch.

As best seen in FIGS. 6 and 9, drawbar 28 includes a top wall 28a, a bottom wall 28b, a first side wall 28c, and a second side wall 28d. The top wall 28a, bottom wall 28b, first side wall 28c and second sidewall 28d bound and define an interior bore 28e (FIG. 8). Bore 24e originates in an opening defined by a free end of drawbar 28, where the free end is located remote from trailer ball 26. A hole 28f is defined in each of the first side wall 28c and second side wall 28d of drawbar 28 and these holes 28f are in fluid communication with bore 28e. Holes 28f are located so as to be selectively alignable with the holes 22f of receiver tube 22 when drawbar 18 is inserted into bore 22e of receiver tube 22.

In another embodiment, no shown herein, the drawbar may be a substantially solid rectangular cuboid that defines a through-hole that extends from a first side surface of the drawbar to a second side surface of the drawbar. This through-hole is selectively alignable with the holes 22f defined in the first and second sides 22c, 22d of receiver tube 22.

When drawbar 18 is inserted into bore 22e of receiver tube 22 in the direction indicated by arrow "A" (FIG. 1), ball mount 18 is manipulated until holes 28f of drawbar 28 are aligned with holes 22f of receiver tube 22 as illustrated in FIG. 8. A hitch pin 30 is then inserted through the aligned holes 22f, 28f and is locked in place in any suitable manner such as by way of a cotter pin (not shown). Once hitch pin 30 is engaged through holes 22f, 28f, drawbar 28 is not able to be withdrawn from bore 22e of receiver tube 22.

Referring still to FIG. 1, as indicated earlier herein, trailer 12 has a trailer coupler 20 at a free end and the trailer coupler 20 is configured to be selectively engageable with ball mount 18. Trailer coupler 20 includes a ball socket 32 which is configured to selectively receive the trailer ball 26 of ball mount 18 therein. A spring-loaded handle 34 is also provided on trailer coupler 20 to lock trailer ball 26 into ball socket 32. Trailer 12 typically will also include a landing gear or trailer jack (not shown) that may be utilized to selectively raise and lower trailer coupler 20 to an appropriate height relative to the ground and to trailer ball 26. Vehicle 10 is maneuvered into position in front of trailer 12 and then the landing gear is actuated to lower trailer coupler 20 to a height where the trailer ball 26 is received within ball socket 32. The spring loaded handle 34 is moved into a locking position where it secures trailer ball 26 within ball socket 32. At this point the trailer 12 is coupled to the vehicle 10. Typically, the vehicle operator will then hook chains (not shown) between the trailer 12 and trailer hitch 16 and will also connect electrical wiring (not shown) on trailer 12 to appropriate electrical connections (not shown) on vehicle 10. The electrical wiring provides power to operate lights an indicators on the rear of the trailer 12.

All of the components discussed in the above description are known in the prior art as customary components and a typical methodology for coupling a trailer 12 to a vehicle.

The present inventor has recognized that even through drawbar 28 of ball mount 18 is fabricated to be generally complementary to the dimensions and configuration of bore 22e of receiver tube 22, when ball mount 18 is secured to receiver tube 22, there is still a tendency for the drawbar 28 and receiver tube 22 to move relative to one another as the trailer 12 is towed by vehicle 10. This relative movement generates a rattling sound that may be heard by occupants of the vehicle.

As discussed in the Background of this document, others have solved this rattling problem by engaging U-shaped bolts and locking plates with the drawbar of the ball mount and the receiver tube of the trailer hitch, or by utilizing spring-loaded hitch pins to secure the drawbar and receiver tube to one another. The problem with these prior art devices is they often include multiple components, nuts and bolts, keys, etc. that may be misplaced when the ball mount is later disengaged from the receiver tube.

The present inventor has recognized a more elegant solution, namely, a silencer assembly that remains engaged with the drawbar 28 of ball mount 18 at all times and is generally indicated herein by the reference number 36. The silencer assembly 36 in its simplest form comprises a first silencer member 38 shown in FIG. 2 and FIG. 5. The first silencer member 38 is provided for substantially permanent engagement with drawbar 28 of ball mount 18, as will be described later herein. Silencer assembly 36 may further comprises a second silencer member 40 which is also provided for substantially permanent engagement with drawbar 28 of ball mount 18, as will be later described. Silencer assembly 36, may further comprise a first shim 42 (FIG. 4) that is positioned between one of the first silencer member 38 and second silencer member 40, when engaged with drawbar 28, and the interior wall of receiver tube 22 which defines bore 22e. Silencer assembly 36 may further comprise a second shim 44 (FIG. 5) which may be positioned between the other of the first silencer member 38 and second silencer member 40, when engaged with drawbar 27, and the interior wall of the receiver tube 22 which defines bore 22e. In other embodiments, one or both of first shim 42 and second shim 44 may be positioned between a portion of first silencer member 38 and a portion of second silencer member 40, when engaged with drawbar 28, and the interior wall of receiver tube 22 which defines bore 22e.

The configuration of first silencer member 38, second silencer member 40, first shim 42, and second shim 44, and the method of use thereof will now be described in greater detail hereafter.

First silencer member 38 and second silencer member 40 are substantially identical to one another and therefore only first silencer member 38 will be discussed in detail. It should be understood, however, that the description relating to first silencer member 38 applies equally to second silencer member 40.

As illustrated in FIGS. 2, 3, and 5, first silencer member 38 comprises a flexible planar sheet of material having an outer surface 38a, an inner surface 38b, a first end 38c, a second end 38d, a first side 38d and a second side 38e. First silencer member 38 is fabricated from any sheet material that is strong, low friction, durable, has a high abrasion resistance, and high wear resistance. Additionally, a suitable material is one that tends not to be subject to breakdown through exposure to sunlight, i.e., the material is ultra violet light resistant. One suitable material for first silencer member 38 is a high performance polymer. One suitable high performance polymer is an ultra-high molecular weight polyethylene. It will be understood that suitable materials may be utilized for first silencer member 38.

The planar sheet is configured to be generally rectangular in shape and is of a length "L" measured between first end 38c and second end 38d. The planar sheet is of a width "W" measured between first side 38e and second side 38f. The planar sheet is furthermore of a thickness (not shown) measured between outer surface 38a and inner surface 38b.

In one embodiment, for a drawbar 28 that is 2″ in width, the length "L" of first silencer member 38 is from about 4.5 inches in length up to about 6.5 inches in length. In one embodiment, the first silencer member 38 is about 5.5 inches in length. In one embodiment, the width "W" of first silencer member 38 is from about 2.5 inches in width up to about 3.25 inches in width. In one embodiment, the width "W" is about 2.875 inches wide. In one embodiment, the thickness of first silencer member 38 is from about 0.015 inches thick up to about 0.025 inches thick.

First silencer member 38 has a longitudinal axis "Y" that extends between first end 38c and second end 38d along a midline of the planar sheet, where the midline is located substantially equidistant from first side 38e and second side 38f. A plurality of fold lines 38g extends between first end 38c and second end 38d of first silencer member 38. The plurality of fold lines 38g is arranged in two laterally spaced apart groups of fold lines, where the first group and the second group are located a distance "D" laterally apart from one another. In one embodiment, "D" is about xxxx. The first group of fold lines 38g is located proximate first side 38e and the second group of fold lines 38g is located proximate second side 38f. A central region 46 of first silencer member 38 is located between the two innermost folds 38g'. The central region 46 is free of any fold lines 38g.

The fold lines 38g in each of the first group and the second group are arranged parallel to one another. The fold lines 38g are furthermore arranged parallel to first side 38e and second side 38f and to the longitudinal axis "Y". Each fold line 38g may simply be a bending region or it may comprise a line or weakness or a line of perforations. Adjacent fold lines are located a distance laterally apart from one another. As illustrated in FIG. 2, the first silencer member 38 has three laterally spaced apart folds in each of the first group and the second group. The three folds include the innermost fold 38g', an outermost fold 38g", and a middle fold 38y'". The spacing between adjacent folds, such as middle fold 38g'" and outermost fold 38g" is indicated as "Dl". In one embodiment "Dl" is about 0.020 inches. In one embodiment, the fold lines 38g include a plurality of perforations. In this embodiment, the ties, i.e., the uncut areas along that fold line 38g may each be about ⅟₁₆ inch long and the cut areas (i.e., the perforations) may be about ⅜ inch long. The first group and second group of fold lines 38g may be centered about 1 inch from the midline of the planar sheet of material.

An adhesive layer 48 is provided on inner surface 38b of first silencer member 38. In one embodiment, a suitable adhesive for adhesive layer 48 is an acrylic based, pressure sensitive adhesive with a peel strength of from about 6 pounds per inch up to about 10 pounds per inch at about 72° F. It will be understood that any adhesive which enables first silencer member 38 to remain adhered to drawbar 28 under hot and cold conditions, over an extended length of time, and through repeated towing of trailers behind vehicle 10 will be suitable for use as adhesive layer 48.

A selectively removable release film 50 is applied over the adhesive layer 48 to stop the first silencer member 38 from inadvertently sticking to surrounding surfaces before installation on drawbar 28. Release film 50 may extend slightly past the at least some of the outermost edges of first silencer member 38 so that a user is able to grasp hold of release film 50 to peel the same off from over the adhesive layer 48 when the user is ready to install the first silencer member 38 on drawbar 28. In one embodiment, release film 50 may extend beyond at least one edge of first silencer member 38 by about ⅛ inch.

Figure 4:
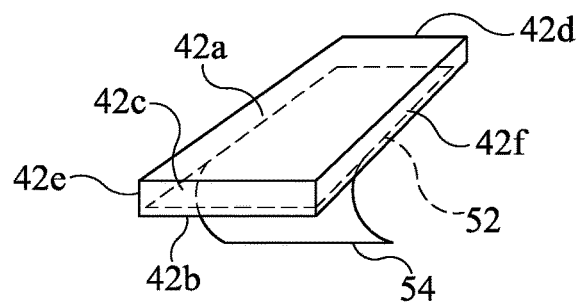
FIG. 4 is a top, right side perspective view of a first shim of the silencer assembly shown in isolation.

First shim 42 and second shim 44 are substantially identical in structure and function. First shim 42 will be described hereafter in greater detail but it will be understood that the description applies equally to second shim 44. As best seen in FIG. 4, first shim 42 is a flexible, planar strip of material that has an outer surface 42a, an inner surface 42b, a first end 42c, a second end 42d, a first side 42e, and a second side 42f. First shim 42 is of a length from first end 42c to second end 42d that is substantially similar to the length "L" of first silencer member 38. First shim 42 is of a width that is substantially less than the width of the first silencer member 38. In one embodiment, first shim 42 is of a width that is substantially equal to or less than the distance "D" (FIG. 2) between the first group and second group of folds 38g in first silencer member 38.

In one embodiment, first shim 42 may be fabricated from a similar high performance polymer to first silencer member 36 but any other suitable material may be used instead. In one embodiment, for a drawbar of 2 inches in width, first shim 42 may have a thickness of from about 0.015 inches up to about 0.025 inches. In one embodiment first shim 42 may be from about 0.75 inches in width up to about 1.5 inches in width. In one embodiment, first shim may be about 1 inch wide. In one embodiment, first shim 42 may be from about 4.5 inches in length up to about 6.5 inches in length. In one embodiment, first shim 42 may be about 5.5 inches long.

An adhesive layer 52 is provided on inner surface 42b of first shim 42 and a selectively removable release film 54 is applied over the adhesive layer 52. The removable release film 54 is provided to stop the first shim 42 from inadvertently sticking to surrounding surfaces. Release film 54 may extend slightly past at least some of the outermost edges of first shim 42 so that a user is able to grasp hold of release film 54 to peel the same off from over the adhesive layer 42 when the user is ready to install the first shim 42 onto the outer surface 38a of first silencer member 38, as will be described later herein.

When a user is ready to install the silencer assembly 36 on drawbar 28, he or she must first ensure that the drawbar is free of dirt, rust, peeling paint and/or moisture. Silencer assembly 36 is most effective when used on painted or bare metal surfaces that are clean and dry because dirt, rust, peeling paint and/or moisture will tend to interfere with the adhesive layer's 48 ability to adhere properly to drawbar 28.

To determine the fit of first silencer member 38 on drawbar 28, the user will lay first silencer member 38 on the top wall 28a of drawbar 28 in such a way that the folds 38g are oriented parallel to a longitudinal axis of the drawbar 28, i.e., parallel to first and second sides 28c, 28d. The user will select the particular folds 38g', 38g'", and 38g" that ensure that the central region 46 of the drawbar 28 will lay on the top wall 28a of the drawbar 28 and part of the first silencer member 38 proximate the first group of folds will contact the first side 28c of the drawbar 28, and part of the first silencer member 28 proximate the second group of folds will contact the second side 28d of drawbar 28. In other words, first silencer member 38 will bend or fold about the two selected folds to form a U-shape. This is illustrated in FIG. 5. In FIG. 5 where the selected folds for bending of the first silencer member 38 are the two innermost folds 38g'. However, if the drawbar 28 is of a greater width, then the selected folds may be the two middle folds 38g'". If the drawbar 28 is of an even greater width, then the selected folds will be the two outermost folds 38g". The user may "test" the fit of the first silencer member 38 by first bending the same into a U-shape and placing the same onto the drawbar 28. The user will check that the fit of the first silencer member 38 on the drawbar 28 is correct and will make adjustments as necessary (e.g. by folding the first silencer member 38 along different folds). It should be noted that in some instances the user may need to select one innermost fold 38g' and a middle fold 38g'", for example, to ensure the fit of the first silencer member 38 on the drawbar 28 is correct.

When the user is satisfied with the fit of the first silencer member 38 on drawbar 28, he or she will grasp the portion of the release film 50 which extends outwardly beyond the edges of the first silencer member 38 and will gently peel the release film 50 off from the adhesive layer 48. The first silencer member 38 is then very carefully positioned over the top wall 28a with one of the first and second ends 38c or 38d flush with the end of the drawbar 28. For example, in FIG. 5, the second end 38d of first silencer member 38 is flush with the end of the drawbar 28. Additionally, a first portion of the first silencer member 38 extends along an upper portion of the first side wall 28c of drawbar 28, and a second portion of the first silencer member 38 extends along an upper portion of the second side wall 28d of the drawbar 28. The central region 46 and first and second portions of the first silencer member 38 is then pressed into place on the drawbar 28 such that the adhesive layer 48 adheres to the exterior surface of the drawbar 28. It should be noted that the fold line, line of weakness or line of perforations that constitutes each fold line 38g enables the first and second portions of the first silencer member 38 to bend or fold onto the drawbar's first and second side walls 28c, 28d.

The user will then turn drawbar 28 over so that the bottom wall 28b is facing upwardly. Second silencer member 40 is applied to bottom wall 28b and lower portions of the first and second side walls 28c, 28d of drawbar 28 in substantially the same manner as described above. When first silencer member 38 and second silencer member 40 are applied to drawbar 28, there will be silencer material on all four sides of drawbar 28, i.e., on top wall 28a, bottom wall 28b, first side wall 28c, and second side wall 28d. The user may utilize the hitch pin 30 to aid in firmly pressing the first silencer member 38 and second silencer member 40 into adhesion-contact with the drawbar's surfaces. Adequate pressure should be applied to the material of the first and second silencer members 38, 40 on all four surfaces 28a, 28b, 28c, and 28d of the drawbar 28 to ensure the silencer assembly 36 will function reliably for a long period of time.

As is evident from FIG. 6, when first and second silencer members 38, 40 are applied to drawbar 28, there is a gap between the edges of the two members where the sides of the drawbar are exposed and not covered with silencer material. This gap ensures that the holes 28f defined in the first and second sides 28c, 28d remain open and are able to be aligned with the holes 22f in receiver tube 22 and to receive hitch pin 30 therethrough. The silencer assembly 36 should not interfere with the holes 28f, 22f or with the user's ability to insert and secure hitch pin 30. If the user cannot fasten and secure the ball mount 18 within the receiver tube's bore 22e, then the silencer assembly 36 should not be used on that particular ball mount 18.

The user will then test the fit of the silencer assembly 36 by sliding the drawbar 28 into the bore 22e of receiver tube 22, aligning the pairs of holes 22f, 28f and inserting hitch pin 30 through the holes 22f, 28f, and locking the hitch pin 30 in place. The user will then try to jiggle the drawbar 28 up and down and to left and right to see if the fit between the drawbar 28 and receiver tube feels loose, i.e., that the drawbar 28 is moving relative to the receiver tube and producing a rattling noise. If the drawbar 28 and receiver tube 30 move in unison with one another and little to no rattling noise is heard, then ball mount 18 and trailer hitch 16 are ready for use.

If however, the fit between the drawbar 28 and receiver tube 22 feels loose, i.e., the drawbar 28 is still moving relative to receiver tube 22 and a bit of a rattling noise is able to be heard, then hitch pin 30 is withdrawn and drawbar 28 is removed from the bore 22e of receiver tube 22. The user will then place the first shim 42 (with release film 54 still in place over adhesive layer 52) on top of the outer surface 38a of first silencer member 38 and then insert the drawbar 28 back into the receiver tube 22 and engage the hitch pin 30. The user will once again test the fit between drawbar 28 and receiver tube 22. If the drawbar 28 and receiver tube tend to move in unison with one another and there is little to no rattling noise produced when the trailer hitch 16 and ball mount 18 are jiggled, then hitch pin 30 is disengaged and ball mount 18 is withdrawn from its engagement in receiver tube 22. The user will then install the first shim 42 over the central region 46 of first silencer member. First shim 42 is installed by grasping a portion of the release film 54 that extends beyond the outermost edges of first shim 42 and gently peeling the release film 54 from over the adhesive layer 52. First shim 42 is then oriented parallel to the longitudinal axis "Y" of central region 46 of first silencer member 38 and one of the ends 42c or 42d placed flush with the end of the drawbar 28. The adhesive layer 52 on first shim 42 is placed in contact with outer surface 38a of first silencer member 38. First shim 42 is pressed downwardly towards outer surface 38a so that first shim 42 adheres to first silencer member 38. Again, the hitch pin 30 may be used to apply additional pressure to first shim 42 to ensure the component is adequately secured to first silencer member 38.

The user will then insert the drawbar 28 with first and second silencer members 38, 40 and the first shim 42 into the bore 22e of receiver tube 22, align the holes 22f, 28f, and insert the hitch pin 30, locking it in place. The user will then try to jiggle the drawbar 28 up and down and to the left and right to see if there is any rattling noise produced. If the drawbar 28 and receiver tube 30 move in unison and little to no rattling noise is heard, then the user will wait for a period of time to pass for the adhesive layer 48 to set up. There will be from about 40% up to about 75% bonding of the materials within the first hour after application of first silencer member 38 and complete bonding of the first silencer member 38 to drawbar 28 within 48 hours after application. However, after application of silencer assembly 36 to drawbar 28 there is no need to wait any length of time to engage ball mount 18 with trailer hitch 16 and tow trailer 12. The ball mount 18 with silencer assembly 36 engaged may be used immediately. The ability to use the newly silenced ball mount 18 almost immediately is mainly due to the fact that the silencer assembly 36 is enclosed and confined within bore 22e of receiver tube 22.

If however, there is still relative movement between the drawbar 28 and receiver tube 22 and some rattling noises are still being produced, then hitch pin 30 will be removed, drawbar 28 will be withdrawn from bore 22e, and the second shim 44 will be first tested and then engaged drawbar 28 if needed. Second shim 44 is engaged with second silencer member 40 in a substantially similar manner to how first shim 42 is engaged with first silencer member 38 and therefore will not be further described herein.

After second shim 44 is engaged with second silencer member 40, drawbar 28 will be inserted into bore 22e of receiver tube 22. At this this point there should be substantially no relative movement between drawbar 28 and receiver tube 22 and therefore rattling between the two components is silenced.

Advantages of silencer assembly 36 include that the first and second silencer members 38, 40, and the first and second shims 42, 44 may be applied to a drawbar 28 without the use of any tools. Additionally, since the first and second silencer members 38, 40 and first and second shims 42, 44, if installed, remain engaged with drawbar 28 at all times. There are no loose parts that may accidentally be misplaced when drawbar 28 is disengaged from receiver tube 22.

It will be understood that in some applications it may be sufficient to install only the first silencer member 38 or the second silencer member 40. In other applications, it may be sufficient to install one of the silencer members 38 and one or both of the first and second shims 42, 44. In other applications, it may be sufficient to install both of the silencer members 38, 40 and one of the first and second shims 42, 44. In other applications, it may be sufficient to install both of the silencer members 38, 40 and both shims 42, 44.

Silencer assembly 36 is an easy to apply and easy to use solution for unwanted rattling between a trailer hitch 16 and a ball mount 18. The silencer assembly 36 fills the space or gap between an exterior surface of the drawbar 28 and the interior surface of the receiver tube 22 with a very durable, high abrasion resistant, sound deadening or damping material. The material selected for use in the various silencer assembly components should be able to withstand compression and hammering as the vehicle tows the trailer. The material used for the silencer assembly components tends to be more durable than some metals and tends to restrict travel of the drawbar 28 in four different directions. When the ball mount 18 needs to be removed from the trailer hitch 16 and stored, the silencer assembly 36 remains engaged with the drawbar 28, ready for next used of ball mount 18. Because of the type of material from which the silencer assembly components are fabricated, the ball mount 18 with engaged silencer assembly 36 may be stored in any location that would typically be suitable for storing ball mount 18 when silencer assembly 36 is not engaged therewith. The silencer assembly 36 requires only a single time attachment to ball mount 18 and will stay in place relatively indefinitely.

While silencer assembly 36 has been described herein as suitable for use with ball mounts 18 for engagement with trailer hitches 16, it will be understood that silencer assembly 36 is also suitable for use with coupler balls, lunette eyes, bike racks, or other miscellaneous attachments that may be engaged with a trailer hitch. Silencer assembly 36 is not recommended for multi-purpose drawbars.

While first silencer member 38 and second silencer member 48 have been described herein as being generally U-shaped when installed on drawbar 28, it will be understood that in other embodiments one or both of first silencer member 38 and second silencer member 40 may be a flat, planar sheet of material that is applied only to top wall 28a of drawbar 28 or to bottom wall 28b of drawbar 28, respectively. It will be understood that in another embodiment, one or both of the first silencer member 38 and second silencer member 40 may be L-shaped and include a first leg that extends along the top wall 28a (or bottom wall 28b, respectively) of drawbar 28, and a second leg that extends along a portion of one of the first side wall 28c or second side wall 28d of drawbar 28. In one embodiment both of the first silencer member 38 and second silencer member 40 may be L-shaped and the second legs thereof may, in a first instance, extend along a same side wall 28c or 28d, or in a second instance may extend along opposed side walls 28c and 28d.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. In combination, a ball mount including a drawbar, wherein the drawbar has an exterior surface; a trailer hitch receiver tube; a bore bounded and defined by an interior surface of the trailer hitch receiver tube; wherein the drawbar is configured to be inserted into the bore of the adapted for insertion in a bore of a trailer hitch receiver tube; and a silencer assembly comprised of an elastomeric material, that is fixedly engaged with an exterior surface of the drawbar, wherein the silencer assembly is interposed between the exterior surface of the drawbar and the interior surface of the trailer hitch receiver tube such that a first surface of the elastomeric material directly abuts the exterior surface of the drawbar and a second surface of the elastomeric material is adjacent the interior surface of the trailer hitch receiver tube that defines the bore.

2. The combination according to claim 1, wherein the silencer assembly comprises a first silencer member that is fixedly engaged with one of a top surface and a bottom surface of the drawbar.

3. The combination according to claim 2, wherein the first silencer member includes a first portion that is fixedly engaged with a first side wall of the drawbar.

4. The combination according to claim 3, wherein the first silencer member includes a second portion that is fixedly engaged with a second side wall of the drawbar.

5. In combination,
a ball mount including a drawbar adapted for insertion in a bore of a trailer hitch receiver tube;
a silencer assembly that is fixedly engaged with an exterior surface of the drawbar, wherein the silencer assembly is interposed between the exterior surface of the drawbar and an interior surface of the trailer hitch receiver tube that defines the bore;
wherein the silencer assembly comprises a first silencer member that is fixedly engaged with one of a top surface and a bottom surface of the drawbar; and
wherein the silencer assembly further comprises a second silencer member that is fixedly engaged with the other of the top surface and the bottom surface of the drawbar.

6. The combination according to claim 5, wherein the second silencer member includes a first part that is fixedly engaged with a first side wall of the drawbar.

7. The combination according to claim 6, wherein the second silencer member includes a second part that is fixedly engaged with a second side wall of the drawbar.

8. The combination according to claim 4, wherein each of the first portion and the second portion of the first silencer member is separated from a remainder of the first silencer member by a fold line, and each of the first portion and the second portion is foldable relative to the remainder of the first silencer member about the fold line.

9. The combination according to claim 8, wherein the fold line includes a series of spaced apart perforations.

10. The combination according to claim 2, further comprising an adhesive layer applied between the first silencer member and the exterior surface of the drawbar to fixedly engage the first silencer member to the exterior surface.

11. The combination according to claim 10, wherein the adhesive layer retains the first silencer member in engagement with the drawbar through repeated insertions and withdrawals of the drawbar with respect to the trailer hitch receiver tube.

12. The combination according to claim 2, further comprising a first shim that is selectively fixedly engageable to an outer surface of the first silencer member.

13. The combination according to claim 12, further comprising an adhesive layer provided between the first shim and the outer surface of the first silencer member.

14. A silencer assembly for use in damping rattling in a trailer hitch assembly, wherein said silencer assembly comprises:
a sheet of material that is planar and flexible and has an outer surface and an opposed inner surface, a first end and an opposed a second end, and a first side and opposed second side, said sheet of material having a longitudinal axis which extends between the first and second ends;
a first fold line located a distance inwardly from the first side and a second fold line located a distance inwardly from the second side, wherein the first fold line and second fold line extend between the first end and the second end of the sheet of material and are oriented parallel to one another and to the longitudinal axis;
a central region located between the first fold line and the second fold line and extending between the first end and the second end of the sheet of material, wherein a first region of the sheet of material between the first fold line and the first side is foldable relative to the central region in a first direction, and wherein a second region of the sheet of material between the second fold line and the second side is foldable relative to the central region in a second direction so as to form the sheet of material into a U-shaped component; and
a layer of adhesive applied over the inner surface of the sheet of material, said adhesive being adapted to secure the U-shaped component to a drawbar of a ball mount that is insertable into a bore of a receiver tube of the trailer hitch assembly.

15. The silencer assembly according to claim 14, wherein each of the first fold line and the second fold line includes a series of perforations.

16. The silencer assembly according to claim 14, wherein the sheet of material is a sheet of a high performance polymer.

17. The silencer assembly according to claim 14, wherein the layer of adhesive is a layer of a pressure-sensitive adhesive.

18. A method of preventing rattling between a trailer hitch receiver tube and a drawbar of a trailer ball mount, said method including steps of:
providing a planar sheet of material that is one or more of durable, abrasion-resistant, wear-resistant, ultra-violet light resistant, and sound dampening;
applying an adhesive to a bottom surface of the planar sheet of material;
placing the planar sheet of material on one of a top wall and a bottom wall of a portion of the drawbar that is receivable in a bore of the trailer hitch receiver tube;
fixedly securing the planar sheet of material to the top wall with the adhesive;
occupying at least part of a gap defined between an exterior surface of the drawbar and an interior surface of the trailer hitch receiver tube that defines the bore; and reducing relative movement between the drawbar and the interior surface of the trailer hitch receiver tube with the planar sheet of material.

19. The method according to claim 18, further comprising:
reducing rattling noises produced by the drawbar moving within the bore with the planar sheet of material.

20. The method according to claim 18, further comprising:
folding a first region of the planar sheet of material about a fold line and extending the first region along a portion of a side wall of the drawbar.

21. The method according to claim 20, further comprising:
terminating the first region of the planar sheet of material a distance away from a hitch-pin-receiving hole defined in the side wall of the drawbar.

22. The method according to claim 18, further comprising:
providing a shim;
adhering the shim to an outer surface of the planar sheet of material;
inserting the drawbar into the bore of the trailer hitch receiver tube; and
further reducing relative movement between the drawbar and the interior surface of the trailer hitch receiver tube with the shim.

23. A method of preventing rattling between a trailer hitch receiver tube and a drawbar of a trailer ball mount, said method including steps of: providing a planar sheet of material that is elastomeric and one or more of durable, abrasion-resistant, wear-resistant, ultra-violet light resistant, and sound dampening; placing the planar sheet of material on one of a top wall and a bottom wall of a portion of the drawbar that is receivable in a bore of the trailer hitch receiver tube; occupying at least part of a gap defined between an exterior surface of the drawbar and an interior surface of the trailer hitch receiver tube that defines the bore with the planar sheet of material, wherein a first surface of the planar sheet of material directly abuts the exterior surface of the drawbar and a second surface of the planar sheet of material is adjacent the interior surface of the trailer hitch tube; and reducing relative movement between the drawbar and the interior surface of the trailer hitch receiver tube with the planar sheet of material.

* * * * *